United States Patent [19]

Altes

[11] Patent Number: 5,340,899
[45] Date of Patent: Aug. 23, 1994

[54] METHOD FOR THE PREPARATION OF POLYDIMETHYLSILOXANES HAVING LOW REACTIVITY ENDGROUPS AND HIGH REACTIVITY ENDGROUPS WHEREIN THE POLYDIMETHYLSILOXANES CONTAIN ETHYLENE CHAIN LINKAGES

[75] Inventor: Michael G. Altes, Midland, Mich.

[73] Assignee: Dow Corning Corporation, Midland, Mich.

[21] Appl. No.: 156,129

[22] Filed: Nov. 22, 1993

[51] Int. Cl.$^5$ .................. C08G 77/04; C08G 77/06; C08G 77/60
[52] U.S. Cl. .................. 528/34; 528/17; 528/35; 525/477; 525/479; 524/731; 524/783; 524/785; 524/786; 524/779; 524/780; 524/788; 524/789
[58] Field of Search .................. 528/34, 35, 17; 525/477, 479; 524/731, 783, 785, 786, 779, 780, 788, 789

[56] References Cited

U.S. PATENT DOCUMENTS

| | | | |
|---|---|---|---|
| 3,122,522 | 2/1964 | Brown et al. | 260/46.5 |
| 3,175,993 | 3/1965 | Weyenberg | 260/46.5 |
| 3,274,145 | 9/1966 | Dupree | 260/37 |
| 3,294,739 | 12/1966 | Weyenberg | 260/46.5 |
| 3,334,067 | 8/1967 | Weyenberg | 260/46.5 |
| 4,579,964 | 4/1986 | Totten et al. | 556/434 |
| 4,599,394 | 7/1986 | Lucas | 528/15 |
| 4,652,624 | 3/1987 | Allen et al. | 528/35 |
| 4,731,411 | 3/1988 | Lucas | 524/860 |
| 4,871,827 | 10/1989 | Klosowski et al. | 528/17 |
| 4,898,910 | 2/1990 | Kamis et al. | 524/860 |

*Primary Examiner*—Melvyn I. Marquis
*Attorney, Agent, or Firm*—Roger H. Borrousch

[57] ABSTRACT

A method of making a polydimethylsiloxane which has both low reactivity endgroups of the formula $$(R''O)R_2SiO-$$

where R" is an alkyl group of 1 to 4 carbon atoms, and high reactivity endgroups of the formula $$(R''O)_{3-f}Me_fSiCH_2CH_2-$$

or

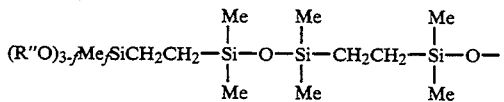

in which a polydimethylsiloxane having the high reactivity endgroups is mixed with a hydroxyl terminated polydimethylsiloxane and then a difunctional silane, $R_2SiX_2$ where R is methyl or vinyl and X is N-methylacetamido. These polydimethylsiloxanes are useful for making sealants with reduced modulus.

4 Claims, No Drawings

METHOD FOR THE PREPARATION OF POLYDIMETHYLSILOXANES HAVING LOW REACTIVITY ENDGROUPS AND HIGH REACTIVITY ENDGROUPS WHEREIN THE POLYDIMETHYLSILOXANES CONTAIN ETHYLENE CHAIN LINKAGES

BACKGROUND OF THE INVENTION

1. Field of the Invention

This invention relates to a method for preparing polydimethylsiloxanes which have both low reactivity endgroups and high reactivity endgroups and the resulting polydimethylsiloxanes can be used to lower the modulus of sealants prepared therefrom.

2. Prior Art

Many methods have been proposed for the reduction of the modulus of siloxane sealants. One method of making the polydimethylsiloxanes to reduce or regulate the modulus of siloxane sealants is illustrated by the method described by Dupree in U.S. Pat. No. 3,274,145, issued Sep. 20, 1966. Dupree describes the preparation of polydimethylsiloxanes in which the terminal radicals are in part siloxanols and in part triorganosilyl groups. Dupree describes four method of making these polydimethylsiloxanes. In his first method, a calculated amount hexaorganodisiloxane or a low molecular weight triorganosilyl endblocked polydimethylsiloxane is polymerized with cyclic polydimethylsiloxane or hydroxyl endblocked polydimethylsiloxane or both in the presence of a bond-rearranging catalyst such as potassium hydroxide. A second method of Dupree is combining a mixture of hydroxyl endblocked polydimethylsiloxane with a triorganosilanol or triorganosilyldisiloxanol with a condensation catalyst. A third method of Dupree reacts a triorganohalosilane with a hydroxyl endblocked polydimethylsiloxane in the presence of an acid acceptor, such as alpha-picoline. Although a fourth method is described by Dupree, it would first involve forming polymer using one of the other methods. Dupree teaches that increasing the number of endgroups which are triorganosiloxy groups decreases the modulus.

U.S. Pat. No. 3,122,522, issued Feb. 25, 1964 to Brown and Hyde discloses a siloxane composition, each molecule of which consists essentially of (1) at least two units of the formula $$[R'(OCH_2CH_2)_cO]_a(R_b)SiZ(R_2)SiO_{0.5}$$

and units of the formula $$R_dSiO_{(4-d)/2}$$

where each a has a value ranging from 2 to 3, each b has a value ranging from 0 to 1, the sum of a and b in any unit (1) is no greater than 3, each c has a value ranging from 1 to 2, each d has a value ranging from 0 to 2, and Z is a divalent hydrocarbon radical of from 2 to 18 inclusive carbon atoms, Z being free of aliphatic unsaturation. Each molecule of the silicone composition has an average of from 1.3 to 2 R groups per silicon atom and there are at least 7 units of $R_dSiO_{(4-d)/2}$ per molecule.

U.S. Pat. No. 3,175,993, issued Mar. 30, 1965 to Weyenberg discloses a composition consisting essentially of the average formula

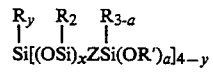

in which each R is free of aliphatic unsaturation, Z is a divalent hydrocarbon radical free of aliphatic unsaturation, y has a value of from 0 to 2 inclusive, x has a value of at least 3 and a has an average value from 2 to 3 inclusive.

Both of the above references teach preparation of the siloxane by reacting siloxanes containing —SiH groups with the appropriate silane containing a monovalent hydro-carbon radical containing an aliphatic or cycloaliphatic group in the presence of a platinum catalyst through the reaction of the —SiH and aliphatic C=C group. This reaction produces the divalent Z radical. Alternatively, the C=C group can be on the siloxane and the —SiH can be on the silane.

Lucas in U.S. Pat. No. 4,599,394, issued Jul. 8, 1986, U.S. Pat. No. 4,731,411, issued Mar. 15, 1988, discloses a process for producing alkoxy-terminated polysiloxanes useful to produce room temperature vulcanizing silicone rubber compositions. The process anhydrously reacts a silanol or vinyl siloxane with a poly-alkoxy crosslinking agent which is an alkoxy silane in tile presence of a platinum catalyst. This alkoxy-terminated polysiloxane can also be mixed with treated filler and condensation catalyst. This application teaches that an alkoxy-terminated polysiloxane having no silethylene linkage at the polymer terminal silicon is equivalent to a polydiorganosiloxane that does contain a trialkoxysilethylene terminal group.

Toten and Pines in U.S. Pat. No. 4,579,964, issued Apr. 1, 1986, discloses an alkoxysilyl functional silicone including at least one functional group of the formula

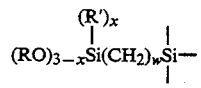

where w is an integer of from 2 to about 20; useful as capable of imparting satisfactory lubricity and other properties such as softness to a variety of textile fabrics.

Kamis et al in U.S. Pat. No. 4,898,910, issued Feb. 6, 1990, teach another method for reducing the modulus of siloxane sealants and show polydimethylsiloxanes which have both vinyl endblocking and alkoxysilethylene endblocking. The polydimethylsiloxanes of Kamis et al are mixtures having the average formula

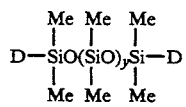

in which Me is methyl radical, M has a value such that the viscosity is within the range of from 0.5 to 3000 Pa.s, each D is a group selected from the group consisting of vinyl radical and radicals of the formula

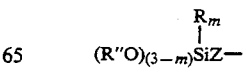

in which Z is a divalent hydrocarbon radical or combination of divalent hydrocarbon radicals and siloxane radicals, R" is methyl, ethyl, propyl, or butyl, m is 0 or 1, where >0% to ≦40% of the D groups are vinyl radicals.

The polydimethylsiloxanes described by Kamis et al can be produced by reacting in the presence of a platinum catalyst a vinyl endblocked polydimethylsiloxane of the formula

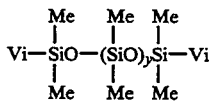

where Vi is a vinyl radical, and Me and y are defined above, with an endcapping compound of the formula

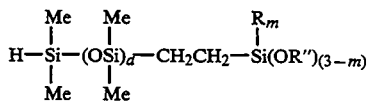

in which R, R", and m are defined above, and d is 1 to 6. This endcapping compound can be made by reacting in the presence of a platinum catalyst one mole of a silane of the formula

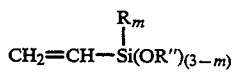

with at least two moles of silicon-bonded hydrogen atom endblocked polydimethylsiloxane of the formula

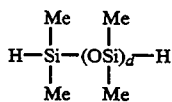

where d is defined above. Any excess silicon-bonded hydrogen endblocked polydimethylsiloxane can be removed by a stripping process.

SUMMARY OF THE INVENTION

This invention relates to a method of making polydimethylsiloxanes having both low reactivity endgroups and high reactivity endgroups comprising, under conditions to exclude moisture from contacting ingredients, (I) mixing (A) an alkoxy terminated polydimethylsiloxane of the formula

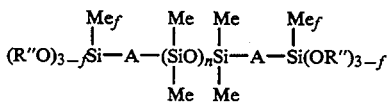

in which each R" is an alkyl radical having from 1 to 4 inclusive carbon atoms, f is 0 or 1, n has a value such that the polymer has a viscosity at 25° C. of from 0.5 to 500 Pa.s, and A is —CH$_2$CH$_2$— or

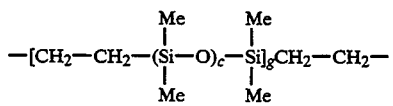

in which g is 0 or 1, and c is from 1 to 6 with (B) a hydroxyl terminated polydimethylsiloxane having a viscosity at 25° C. of from 0.5 to 500 Pa.s, providing a polymer mixture and thereafter (II) admixing with the polymer mixture of step (I) an amount of a hydrolyzable difunctional silane of the formula R$_2$SiX$_2$ in which X is N-methylacetamido and R is methyl or vinyl, sufficient to provide at least one hydrolyzable difunctional silane molecule per hydroxyl of the hydroxyl terminated polydimethyl siloxane.

DESCRIPTION OF THE PREFERRED EMBODIMENTS

The alkoxy terminated polydimethylsiloxane, (A), used in the process of this invention can be those which are described by Klosowski et al in U.S. Pat. No. 4,871,827, issued Oct. 3, 1989 which is hereby incorporated by reference to show the polydimethylsiloxanes and their preparation.

These polymers described by Klosowski et al include those of the formula

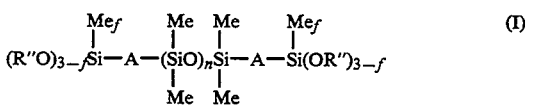 (I)

where Me is methyl radical; each R" is methyl, ethyl, propyl, or butyl; f is 0 or 1; n has a value such that the polydimethylsiloxane has a viscosity at 25° C. of from 0.5 to 500 Pa.s; and A is —CH$_2$CH$_2$— or

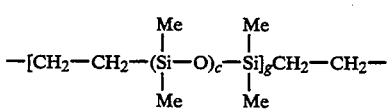

where g is 0 or 1, and c is from 1 to 6.

The alkoxy terminated polydimethylsiloxanes of (A) can be illustrated by the following:

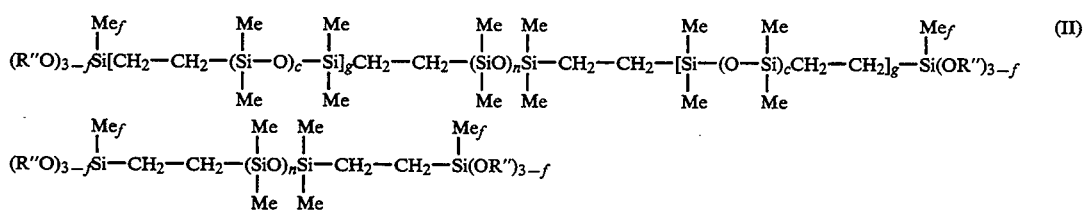 (II)

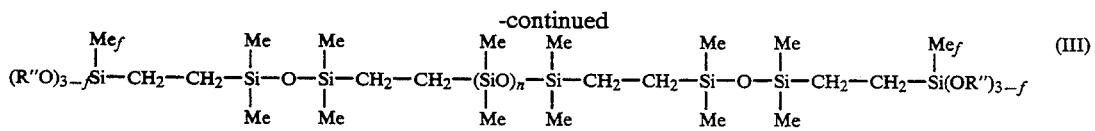

where R″, f, g, c and x are defined above.

One method of preparing alkoxy terminated polydimethylsiloxanes of (A) is to mix a dimethylhydrogensiloxy endblocked polydimethylsiloxane with an excess of vinyltrimethoxysilane in the presence of $H_2PtCl_6$ and heat overnight at 100° C. in the absence of moisture. In this case the product is a polymer of the formula

Alkoxy terminated polydimethylsiloxanes of formula (II) may be produced by reacting a hydrogen endblocked siloxane with a silane of the formula

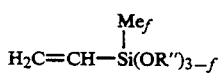

in the presence of a platinum catalyst such as chloroplatinic acid at a temperature of from 30° C. to 150° C. Methods of making these polymers are taught in U. S. Pat. No. 3,175,993, issued Mar. 30, 1965, to Weyenberg, which is hereby incorporated by reference to show methods of manufacturing polymer of formula (II).

Alkoxy terminated polydimethylsiloxanes of formula (III) can be manufactured by reacting a vinyl endblocked polydiorganosiloxane with an endcapping composition of the formula

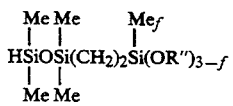

in which R″ and f are defined above, using a platinum catalyst to cause the materials to react. This endcapping composition is prepared by reacting ViMeD$_f$Si(OR″)$_{3-f}$ with (Me$_2$HSi)$_2$O in the presence of a platinum catalyst where only one end of the disilane is reacted. This can be done by combining one mol of the ViMe$_f$Si(OR″)$_{3-f}$ with greater than two mols of the disiloxane. When this mixture is combined with a platinum catalyst, there is a slightly exothermic reaction after a few minutes at room temperature. The color changes from clear to light yellow. A by-product will be present consisting of product produced by the reaction of ViSi(OMe)$_3$ to both ends of the disiloxane. This by-product can be left in the material. At a 1 to 2 ratio, there is about 15 percent by-product produced. If the ratio is changed to 1 to 4 the by-product drops to about 5 percent. The excess siloxane is then stripped from the product.

The above alkoxy terminated polydimethylsiloxane is combined with a hydroxyl terminated polydimethylsiloxane having a viscosity of from 0.5 to 500 Pa.s to provide a polymer mixture. Thereafter, a hydrolyzable difunctional silane of the formula $R_2SiX_2$ is added to the polymer mixture in an amount sufficient to provide at least one hydrolyzable difunctional silane molecule per hydroxyl of the hydroxyl terminated polydimethylsiloxane. In the silane R is methyl or vinyl and X is N-methylacetamido. Silanes can be illustrated by methylvinylbis(N-methylacetamido)silane and dimethylbis(N-methylacetamido)silane.

The polymer mixture can be a mixture of different molecular species where the preferred viscosity is in the range of from 3 to 400 Pa.s (Pascal-seconds). The polymer mixture is preferably a mixture of molecular species such that the hydroxyl terminated polydimethylsiloxane provides >0% to ≦30% of the endgroups which will become low reactivity and the alkoxy terminated polydimethylsiloxane provides ≧70% to <100% of the endgroups which will become high reactivity. The most preferred polydimethylsiloxane are those which have from 5% to 20% of the endgroups being low reactivity and from 80% to 95% of the endgroups being high reactivity. These preferred polydimethylsiloxanes provide a low modulus sealant which is desirable for sealant joints in building constructions.

The low reactivity endgroups have the following formula (R″O)R$_2$SiO— in which R and R″ are defined above, where the R″O group is believed to be derived from N-methylacetamido exchange with trace alcohol in the polymer mixture. The high reactivity endgroups have the following formula

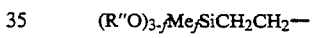

or

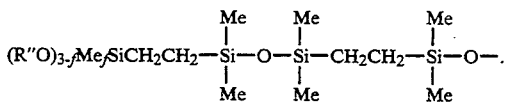

The amount of alkoxy terminated polydimethylsiloxane and hydroxyl terminated polydimethylsiloxane used can be varied to obtain a desired modulus in a cured sealant made using the resulting polymer mixture obtained from the method of this invention. Decreasing the amount of the alkoxy terminated polydimethylsiloxane and increasing the amount of the hydroxyl terminated polydimethylsiloxane decreases the modulus of the resulting cured elastomeric polyorganosiloxane, i.e. the sealant.

The polymer mixture reacts with the silane merely by mixing at room temperature in an environment which protects them from contacting moisture and produce the resulting polydimethylsiloxanes which have low reactivity endgroups and high reactivity endgroups as described above.

The polydimethylsiloxanes of this invention have both low reactivity endgroups and high reactivity endgroups. The ratio of low reactivity endgroups to high reactivity endgroups has a direct influence on the modulus of a sealant prepared using the polydimethylsiloxane. Other factors being equal, increasing the concentration of low reactivity endgroups in the polydimethylsiloxane used to make a sealant, decreases the modulus of the cured sealant. The polydimethylsiloxane of this invention provides less unreacted siloxane species in the sealant composition while providing a low modulus sealant.

The polyorganosiloxane compositions which cure to elastomers at room temperature when exposed to moisture, but remain uncured when protected from moisture are made from the polydimethylsiloxanes having both low reactivity endgroups and high reactivity endgroups, an alkoxysilane, a catalyst for the curing reaction, and a filler.

The alkoxysilanes have the formula

in which R is a monovalent hydrocarbon radical, R" is defined above, and h has an average value of from 2 to 4. Alkoxy groups, OR", can be illustrated by methoxy, ethoxy, propoxy, isopropoxy, and butoxy. Examples of alkoxysilanes include methyltrimethoxysilane, vinyltrimethoxysilane, phenyltrimethoxysilane, vinyltriethoxysilane, tetraethyl orthosilicate, tetramethyl orthosilicate, ethyltrimethoxysilane, propyltrimethoxysilane, methyltriethoxysilane, phenyltriethoxysilane, butyltripropoxysilane, pentyltriisopropoxysilane, methyldimethoxyethoxysilane, and methyldiethoxymethoxysilane. These alkoxy silanes and their method of manufacture are well known. Preferred are the silanes in which there are three alkoxy groups present, such as methyltrimethoxysilane. The amount of crosslinker preferably is from 0.35 to 9.0 parts by weight, with from 2 to 8 parts most preferred. It is possible to produce useful sealants without using a crosslinker when the polymer of this invention is present because of the functionality of the polymer itself, but from a practical viewpoint, the crosslinker is useful in that it contributes to the excellent shelf life of the sealant. It is also useful in controlling the degree of crosslinking in the cured elastomeric sealant; more of the crosslinker results in a harder, lower elongation elastomer.

The sealants prepared using the polymer produced by the method described herein can be cured through the use of a titanium catalyst. The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, and bis-(acetylacetonyl)-diisopropyltitanate. The amount of catalyst is from 0.2 to 6.0 parts by weight per 100 parts by weight of polymer (1). Preferred are from 0.5 to 3.0 parts by weight.

Sealant compositions using the polymers of this invention can also contain a filler. These fillers can be those generally used in formulating silicone sealants, and include both reinforcing fillers such as fumed silica, hydrophobicized fumed silica, hydrophobicized precipitated silica, and carbon black and non-reinforcing fillers such as calcium carbonate, stearic acid treated calcium carbonate, precipitated calcium carbonate, finely pulverized quartz, diatomaceous earth, titanium dioxide, alumina, iron oxide, magnesium oxide, and zinc oxide. Reinforcing fillers are commonly used in amounts from about 5 to 50 parts by weight to give the highest physical properties, such as tensile strength. Extending fillers are finely ground in that the average particle size is in the range of from about 1 to 10 micrometers. Extending fillers are used in amounts as high as 500 parts by weight per 100 parts by weight of polymer in some cases.

The method of this invention is used to produce polymers which can be used to produce improved silicone elastomeric sealants. The polymer mixtures produced by the method of this invention can be mixed with any filler (if used) until a uniform mixture is obtained. Mixing can be with a low shear mixer or stirrer in the case of the extending fillers or with a high shear mixer such as a dough mixer or 3-roll mill in the case of the reinforcing fillers. After the polymer and filler are mixed, it is desirable to place them in a container and centrifuge them to remove any entrapped air and its accompanying moisture. Then a deaired mixture of crosslinker, and titanium catalyst are added in the absence of exposure to moisture. They are thoroughly stirred to give a uniform mixture. The uniform mixture is then preferably deaired, aged 24 hours and again deaired by exposing the mixture to a vacuum to remove any volatiles or moisture from the mixture. The mixture is then sealed into storage containers, sealant tubes for example, to store it until it is to be used.

Sealant compositions made from the polymer products of this invention can contain a silane adhesion promoter. The breadth of substrates to which the sealants can be adhered can be increased as well as the consistency of the adhesion can be maintained by the addition of a silane adhesion promoter. The silanes which act as adhesion promoters are preferably aminoorganotrialkoxysilanes and glycidoxyorganotrialkoxysilane. Aminoorganotrialkoxysilanes are illustrated by gamma-aminopropyltriethoxysilane and N-beta-aminoethyl-gamma-aminopropyltrimethoxysilane. Glycidoxyorganotrialkoxysilanes are illustrated by gamma-(glycidoxy)propyltrimethoxysilane. In addition to providing adhesion to substrates, these silanes also increase the cure rate of the sealant, especially elastomeric polydimethylsiloxane compositions which contain as ingredient (B) ketoximosilanes. The amounts of such silane adhesion promoters is small, usually less than one weight percent of the composition, preferably less than 0.5 weight percent. The preferred silane adhesion promoters are mixtures of aminoorganotrialkoxysilane and glycidoxyorganotrialkoxysilane.

When curable compositions are produced using the polymers of this method, they can be stored in containers which protect them from entrance of moisture and then when they are exposed to moisture, they cure to give an elastomeric silicone where the modulus can be predetermined by the mixture of the alkoxy terminated polydimethylsiloxane and hydroxyl terminated polydimethylsiloxane used to make the polymer product. Such composition are useful as a sealant material for filling spaces and gaps as in sealing buildings.

The following examples are for illustrative purposes and should not be construed as limiting the invention which is properly delineated in the claims. In the following examples, viscosities are at 25° C., "part" or "parts" are by weight, Me represent methyl radical, Vi represents vinyl radical.

EXAMPLE

A polydimethylsiloxane which contained low reactivity endgroups and high reactivity endgroups was prepared by mixing 75 parts of a polydimethylsiloxane having a viscosity of about 50 Pa.s and endgroups of the following formula

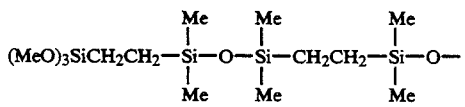

and 25 parts of a hydroxyl endblocked polydimethylsiloxane having about 0.05 weight percent hydroxyl groups. To the resulting polymer mixture, one part of methylvinylbis(N-methylacetamido)silane was added and allowed to react for 2 minutes. The resulting polymer product contained polydimethylsiloxane which had low reactivity endgroups of the formula

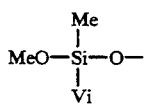

and high reactivity endgroups of the formula

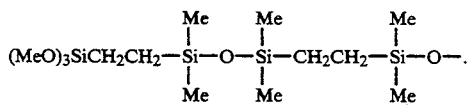

This polymer product was used to make a sealant composition. In a mixer which protected the ingredients from moisture, 100 parts of the above polymer product was mixed with 6 parts of methyltrimethoxysilane, 60 parts of stearate treated precipitated calcium carbonate filler, and 2 parts of di-isopropoxy titanium di(ethyl-3-oxobutanoate) were mixed. The resulting sealant composition was stored in a container which prevented the ingress of moisture into the sealant composition. A bead of sealant composition was extruded and exposed to atmosphere at about 20° C. and 50% relative humidity (room temperature). The extruded bead had a skin-over-time of 71 minutes and a tack-free-time of 176 minutes. After exposure for two weeks at room temperature, the sealant had a 100% modulus of 0.92 MPa, an ultimate tensile strength of 2.23 MPa, an ultimate elongation of 322%, a durometer on the Shore A scale of 32, and extractables of 5.9%. After an additional exposure to 50° C. for two weeks, the 100 percent modulus was 1.11 MPa, the ultimate tensile strength was 2.74 MPa, the ultimate elongation was 307%, the durometer on the Shore A scale was 27, and the extractables were 4.2%.

COMPARISON EXAMPLE

A sealant composition was prepared by mixing 75 parts of a polydimethylsiloxane having a viscosity of about 50 Pa.s and endgroups of the following formula

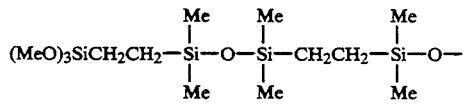

and 25 parts of a hydroxyl endblocked polydimethylsiloxane having about 0.05 weight percent hydroxyl groups. To the resulting mixture, 6 parts of methyltrimethoxysilane, 60 parts of the calcium carbonate filler as used in the Example, and 2 parts of di-isopropoxy titanium di(ethyl-3-oxobutanoate) were mixed. The resulting sealant composition was stored in a container which prevented the ingress of moisture into the sealant composition. A bead of sealant composition was extruded and exposed to atmosphere at about 20° C. and 50% relative humidity (room temperature). The extruded bead had a skin-over-time of 18 minutes and a tack-free-time of 28 minutes. After exposure for two weeks at room temperature, the sealant had a 100% modulus of 1.08 MPa, an ultimate tensile strength of 2.08 MPa, an ultimate elongation of 232%, a durometer on the Shore A scale of 34, and extractables of 2%. After an additional exposure to 50° C. for two weeks, the 100 percent modulus was 1.19 MPa, the ultimate tensile strength was 2.58 MPa, the ultimate elongation was 248%, the durometer on the Shore A scale was 35, and the extractables were 2.2%.

That which is claimed is:

1. A method of making polydimethylsiloxanes having both low reactivity endgroups and high reactivity endgroups comprising, under conditions to exclude moisture from contacting ingredients, (I) mixing (A) an alkoxy terminated polydimethylsiloxane of the formula

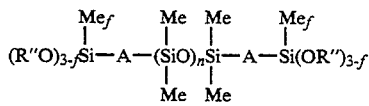

in which each R'' is an alkyl radical having from 1 to 4 inclusive carbon atoms, f is 0 or 1, n has a value such that the polymer has a viscosity at 25° C. of from 0.5 to 500 pa.s, and A is $-CH_2CH_2-$ or

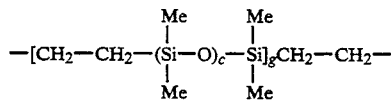

in which g is 0 or 1, and c is from 1 to 6 with (B) a hydroxyl terminated polydimethylsiloxane having a viscosity at 25° C. of from 0.5 to 500 Pa.s, providing a polymer mixture and thereafter (II) admixing with the polymer mixture of step (I) an amount of a hydrolyzable difunctional silane of the formula

in which X is N-methylacetamido and R is methyl or vinyl, sufficient to provide at least one hydrolyzable difunctional silane molecule per hydroxyl of the hydroxyl terminated polydimethylsiloxane.

2. A polydimethylsiloxane obtained from the method of claim 1.

3. A polydimethylsiloxane according to claim 2 in which the polydimethylsiloxane has low reactivity endgroups having a formula

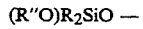

where R″ is an alkyl group of 1 to 4 carbon atoms, and high reactivity endgroups having a formula (R″O)₃₋ⱼMeⱼSiCH₂CH₂— or

-continued (R″O)₃₋ⱼMeⱼSiCH₂CH₂—Si(Me)(Me)—O—Si(Me)(Me)—CH₂CH₂—Si(Me)(Me)—O—.

4. A sealant composition comprising the product of the method of claim 1, an alkoxysilane, a catalyst for curing the composition, and a filler.

* * * * *